Jan. 10, 1956  A. T. FUSCHI  2,730,377
TRAILER UNCOUPLING PREVENTING SAFETY MEANS
Filed Sept. 18, 1953
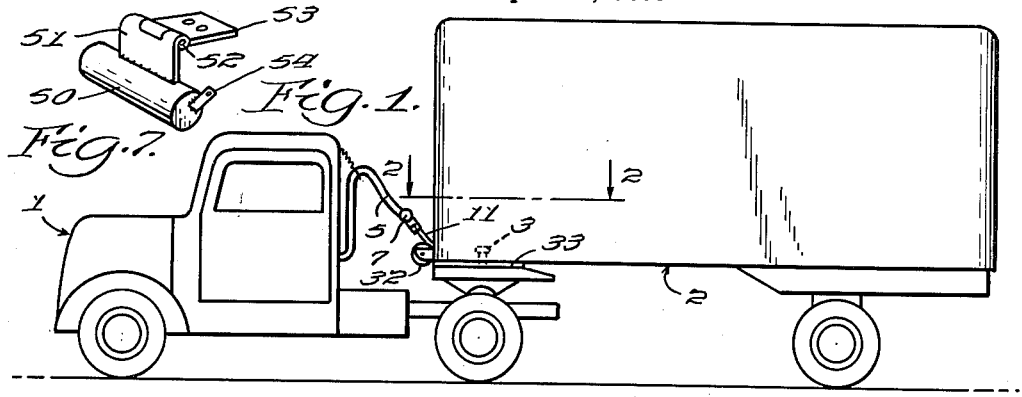
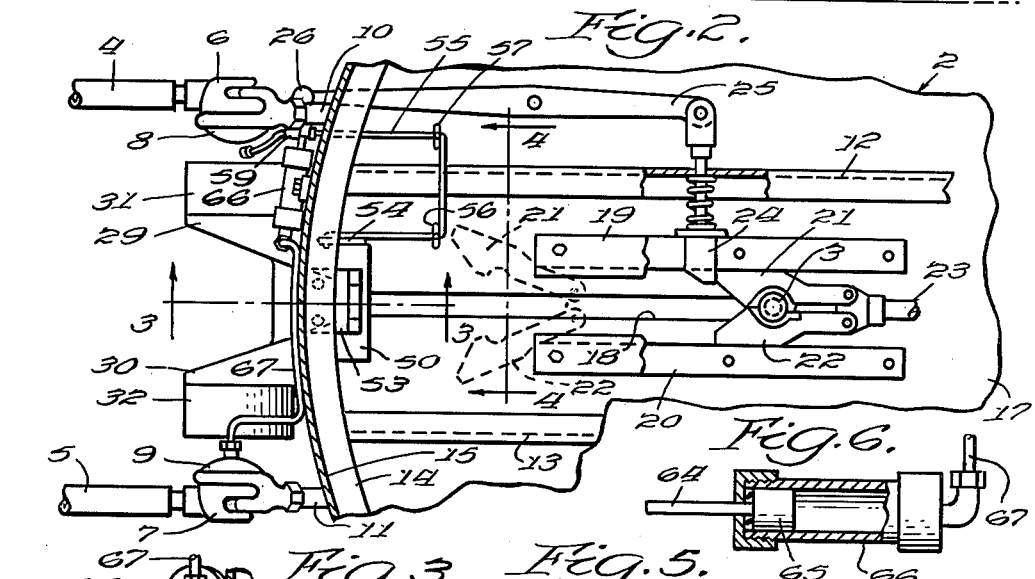
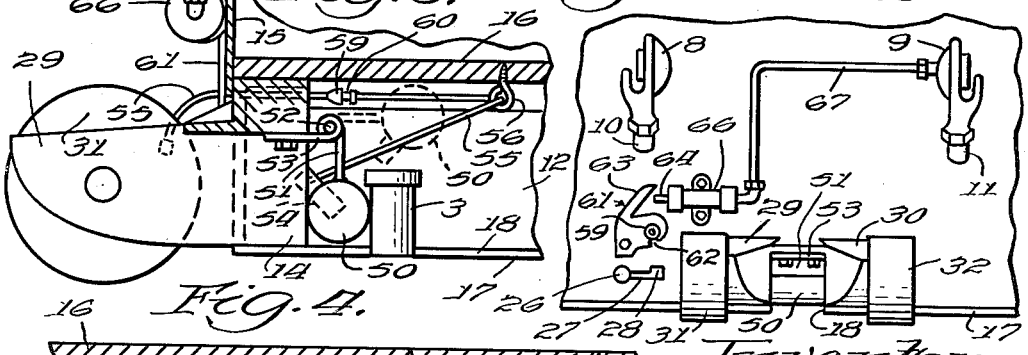
Inventor:
Antonio T. Fuschi
By Harold J. LeVesconte
Atty.

United States Patent Office 2,730,377
Patented Jan. 10, 1956

2,730,377

TRAILER UNCOUPLING PREVENTING SAFETY MEANS

Antonio T. Fuschi, Hollywood, Calif.

Application September 18, 1953, Serial No. 380,913

6 Claims. (Cl. 280—432)

This invention relates to tractor and trailer combinations and more particularly to a safety device for preventing the unintentional or accidental uncoupling of a tractor and trailer or semi-trailer conveyed thereby.

While the devices by which a tractor is coupled to a semi-trailer are generally satisfactory in performance, there have been instances in which the trailer has become uncoupled from the tractor while in transit and going across and off the highway and into the path of oncoming traffic with resultant damage and serious injury and, at times, fatalities. The present invention taking this into consideration, has for its principal object the provision of a means which is independent of the usual coupling and uncoupling devices and which operates at all times to prevent the accidental uncoupling of the tractor and trailer.

Another object of the invention is to provide a means for preventing the accidental uncoupling of a tractor and trailer which is so constructed and arranged as not to interfere with the coupling of the tractor to the trailer in the usual manner in which that operation is accomplished.

A further object of the invention is to provide a device of the above character which, if not otherwise placed in operative position is placed in operative position by the coupling of the air hoses which operate the trailer brakes with resultant assurance that the device is at all times operative when the tractor and trailer are coupled together.

Still another object of the invention is to provide a device of the above character which is simple in construction, is readily installed on existing trailers and which is reliable in operation.

With the foregoing objects in view, together with such other and additional objects and advantages as may subsequently appear, the invention resides in the parts, and in the construction, combination and arrangement of parts disclosed, by way of example, in the following specification of one mode of execution of the invention; reference being had to the accompanying drawings which form a part of said specification and in which drawings:

Fig. 1 is a side elevation of a tractor and semi-trailer combination representative of a type of equipment to which the invention is particularly adapted.

Fig. 2 is an enlarged, fragmentary, top plan view of that portion of the trailer underframe with which the invention is concerned with the invention applied thereto and with the tractor king pin shown in coupled position, Fig. 3 is a further enlarged, fragmentary sectional view taken on the line 3—3 of Fig. 2 showing the manner in which the device constituting the present invention operates to prevent the uncoupling of the tractor and trailer, Fig. 4 is a sectional view on the same scale as Fig. 3 taken on the line 4—4 of Fig. 2, Fig. 5 is a fragmentary view of the front end of a trailer showing that portion of the invention directly affected by the braking means, Fig. 6 is a partly sectional view of the air cylinder forming a part of the invention, and Fig. 7 is a perspective view of the uncoupling means forming a part of the invention.

For convenience in identification, the parts forming the invention will be given a series of numerals spaced from the series of numerals identifying the parts of the tractor and trailer to which the invention is applied.

The invention is shown applied to a tractor 1 and trailer 2 coupled together by a king pin 3 on the tractor engaged by coupling means to be described in detail. The tractor is provided with brake actuating means including air hoses 4 and 5 terminating in coupling members 6 and 7 which interlockingly engage other coupling members 8 and 9 on the ends of brake hose lines 10 and 11 leading to the trailer brakes. The trailer underframe construction comprises a spaced pair of longitudinally extending main frame channel members 12 and 13, a front cross member 14 to which the lower edge of the front wall 15 of the trailer is attached, and a floor plate 16. Secured to the underfaces of the frame members 12 and 13 is a plate 17 having a king pin receiving slot 18 formed therein extending rearwardly from the front end of the trailer. Adjacent the rear end of the slot, the upper face of the plate 17 carries spaced, parallel guides 19 and 20 the opposed faces of which provide a guideway for the king pin engaging jaws 21 and 22 which at their rear ends are hingedly connected to the end of a rod 23 spring biased by means not shown for movement toward the front end of the trailer. Latch means including a spring biased detent 24 and an operating lever 25 having a handle 26 projecting through a slot 27 in the front wall of the trailer; said slot including a lever retaining notch 28 serve to hold the trailer locked to the king pin as shown in Fig. 2. Mounted on the trailer frame structure and projecting forwardly therefrom are brackets 29 and 30 disposed at each side of the slot 18 and having their opposed faces rearwardly converging to the adjacent sides of the slot 18 thereby serving to direct the king pin of a tractor being coupled to the trailer into the slot 18. At their outer faces, the brackets support rollers 31 and 32 which engage and ride across the bolster plate 33 of the tractor as the tractor backs into coupling engagement with the trailer. When uncoupled, the jaws 21 and 22 are moved by the rod 23 to the position shown in broken lines in Fig. 2 and as the king pin enters the slot 18 it encounters the jaws and moves them rearwardly into and along the guideway formed by the guides 19 and 20 and past the detent 24 which then snaps back across the forward end of the jaws to prevent forward movement thereof. When the tractor is to be uncoupled, the air hoses are disconnected and the detent 24 withdrawn by the lever 25 which is locked in the notch 28 for that purpose. The tractor can then be moved away from the trailer with accommodating movement of the jaws 21 and 22 until they reach the forward position and spread to release the king pin. This coupling and uncoupling action is that which has heretofore been the manner of accomplishment and does not take into account the use of the present invention. It has been described in detail in order that the relation of the present invention to the presently used equipment might better be understood.

The invention comprises a short heavy bar 50 having a laterally extending flange portion 51 the free end of which is freely hingedly connected by a pin 52 to the free end of a bracket member 53 secured to the under face of the cross frame member 14 directly above the slot 18 and extending rearwardly of the said cross member. The overall length of the bar 50 is such that when depending vertically it engages the rear end faces of the brackets 29 and 30 and its thickness is such that on entrance of the king pin 3 into the slot 18 incident to the coupling of a tractor to the trailer, it will swing rearwardly and upwardly sufficiently to allow the king pin to pass beneath it and then drop back into position across the slot 18. Thus should the trailer accidentally become uncoupled from the jaws 21 and 22, the king pin can only move along the slot up the bar 50 and that bar will prevent the trailer from being completely uncoupled from the tractor.

The bar 50 at one end thereof, preferably that end which is adjacent the lever 25, has a laterally extending ear 54 to which one end of a pull cord 55 is attached. The card is trained through eyes 56 and 57 attached to the floor of the trailer and thence through a hole 58 in the front wall of the trailer; the eyes being so arranged that a pull on the end of the cord 55 outside of the trailer will produce a rearward and upward movement of the bar 50 bringing it clear of the path of the king pin 3 and permitting it to move out of the slot 18 incident to the uncoupling of the tractor. To hold the bar 50 in this raised position while the tractor is being uncoupled, the cord carries a sleeve member 59 having a groove 60 in its outer surface and positioned so as to be just at the outer surface of the trailer body when the cord has moved the bar 50 to king pin clearing position. Pivotally mounted on the trailer body adjacent to the hole 58 through which the cord 55 extends is a latch member 61 having a slot 62 formed therein engaging the groove 60 in the sleeve 59. When the tractor is to be uncoupled, the driver first disconnects the air brake hoses and releases the detent 24 by manipulation of the lever 25. He also pulls the cord 55 to lift the bar 50 clear of the path of the king pin and secures it in pulled out position by moving the latch 61 to engage the groove 60 in the sleeve 59 at which time the tractor can be pulled free of the trailer.

The recoupling of the tractor to the trailer can be accomplished regardless of whether the bar 50 is raised or is hanging free the only essential being that the lever 25 will be released from the notch 28 so that at the proper time the detent 24 will be free to function. To overcome the possibility that under those conditions, the driver might forget to release the latch 61, the latch is provided with an integral finger portion 63 positioned to be engaged by the end of a rod 64 carried by a piston 65 and projecting from one end of an air cylinder 66 mounted on the front wall of the trailer and in which the piston is mounted; the opposite end of the cylinder being connected by a line 67 to one of the brake line coupling members of the trailer, here shown as coupling 9. Thus when the tractor has been coupled to the trailer and the air hoses are connected, if the bar 50 has not previously been allowed to drop into safety position, the first application of air to the brakes will cause the piston 65 to be moved to the left as viewed in Fig. 5 with resultant release of the latch 61 and dropping of the released bar 50 into safety position. When as an incident to uncoupling, the hose lines are disconnected, the piston may readily be moved to the right as an incident to engaging the latch 61 with the cord, but at all times when there is pressure in the brake lines the lach is held in inoperative position.

Thus, there has been provided a safety means for preventing the accidental uncoupling of a trailer from a tractor which may readily be added to standard existing equipment without changes other than the drilling of a few holes for the attachment of the component parts of the device. The parts are few in number and simple in form. When installed the device completely eliminates the possibility of a trailer becoming uncoupled from the tractor by improper functioning of the coupling means and thus is an important contribution to highway safety.

While in the foregoing specification there has been described and illustrated one mode of execution of the invention, modifications will suggest themselves to those skilled in the art in the light of such disclosure. Therefore, the invention is not to be deemed to be limited to the exact form disclosed by way of example and it is to be understood to include as well all such modifications in the parts and in the construction, combination and arrangement of parts as shall come within the purview of the appended claims.

I claim:

1. The combination with a coupling means for a tractor and a trailer including an upwardly projecting king pin on the tractor movable along a guiding slot on the trailer into and out of locking engagement with king pin engaging jaws on the trailer, and tractor energized braking means on the trailer, of means for preventing accidental or unintended uncoupling of the tractor and trailer comprising a bar normally disposed closely above the guiding slot and hingedly supported by the trailer at a point above the path of the king pin of the tractor incident to movement thereof along the guiding slot; said hinged support being constructed and arranged to permit the bar to be swung upwardly and rearwardly incident to movement of the king pin toward coupling engagement and to drop back to its normal position, said bar being of such length as to engage portions of the trailer frame structure and thereby prevent escape of the king pin from the guiding slot therefor, manually operable means for moving said bar out of the path of the king pin to permit intended uncoupling of the tractor and trailer, other manually operable means for holding said bar out of said path, and means connected to and actuated by the braking means of the tractor and trailer effective to render said holding means inoperative while the braking means is energized.

2. The combination with a coupling means for a tractor and a trailer including an upwardly projecting king pin on the tractor movable along a guiding slot on the trailer into and out of locking engagement with king pin engaging jaws on the trailer, and tractor energized braking means on the trailer, of means for preventing accidental or unintended uncoupling of the tractor and trailer comprising a bar normally disposed closely above the guiding slot and hingedly supported by the trailer at a point above the path of the king pin of the tractor incident to movement thereof along the guiding slot; said hinged support being constructed and arranged to permit the bar to be swung upwardly and rearwardly incident to movement of the king pin toward coupling engagement and to drop back to its normal position, said bar being of such length as to engage portions of the trailer frame structure and thereby prevent escape of the king pin from the guiding slot therefor, manually operable means connected to said bar for moving said bar out of the path of the king pin to permit intended uncoupling of the tractor from the trailer, latch means for holding said bar in said uncoupling permitting position, and devices connected to and actuated by braking means effective to prevent said latch means from holding said bar in uncoupling permitting position when the braking means is energized.

3. The combination with a coupling means for a tractor and a trailer including an upwardly projecting king pin on the tractor movable along a guiding slot on the trailer into and out of locking engagement with king pin engaging jaws on the trailer, and tractor energized braking means on the trailer, of means for preventing accidental or unintended uncoupling of the tractor and trailer comprising a bar normally disposed closely above the guiding slot and hingedly supported by the trailer at a point above the path of the king pin of the tractor incident to movement thereof along the guiding slot; said hinged support being constructed and arranged to permit the bar to be swung upwardly and rearwardly incident to movement of the king pin toward coupling engagement and to drop back to its normal position, said bar being of such length as to engage portions of the trailer frame structure and thereby prevent escape of the king pin from the guiding slot therefor, a pull cord connected to said bar for moving said bar out of the path of the king pin in said guiding slot incident to intended uncoupling of the tractor and trailer, a manually operable latch engageable with said pull cord operable to hold said cord in a position in which said bar is held by said cord out of the path of the king pin in movement out of the guiding slot on the trailer, and pressure responsive means connected to the braking system and disposed in proximity to said latch effective in the presence of braking pressure to prevent movement of said latch into cord engaging position.

4. The combination with a coupling means for vehicles including a king pin on one of the vehicles and king pin receiving means on the other vehicle comprising a king pin receiving slot and releasable means for locking the king pin in the slot, of means for preventing the accidental uncoupling of the vehicles; said means comprising a movably mounted bar normally positioned to block the exit of the king pin from the slot; the mounting for said bar being constructed and arranged to permit the momentary displacement of said bar incident to coupling the vehicles together, manually operable means for moving said bar out of the normal exit blocking position thereof incident to intended uncoupling of the vehicles, latch means manually operable to hold said bar out of said exit blocking position, and means connected to the braking system of the connected vehicles effective upon initial energization of the said connected braking system after the vehicles are coupled together to release said latch with resultant return of said bar to said exit blocking position.

5. The combination with a coupling means for vehicles including a tractor and a trailer and tractor energized braking system for both vehicles; said coupling means including a king pin on one of the vehicles and a king pin receiving slot and locking devices engaging the king pin on the other vehicle, of means for preventing the accidental or unintended uncoupling of the vehicles; said uncoupling preventing means comprising a bar movable into and out of an exit blocking position in the path traversed by the king pin in the king pin receiving slot, means for moving said bar out of said path, and devices connected to the braking system effective upon energization of the braking system to disable said bar moving means with resultant movement of said bar into said path and consequent prevention of escape of the king pin from the receiving slot therefor.

6. An uncoupling preventing means as claimed in claim 5 in which said bar is hingedly mounted upon a horizontal axis disposed beyond the free end of the king pin and is movable on said axis out of and into the path of the king pin along the slot by said means and said disabling devices, respectively.

References Cited in the file of this patent

UNITED STATES PATENTS

| | | |
|---|---|---|
| 1,761,816 | Cadman | June 3, 1930 |
| 2,258,432 | Winn | Oct. 7, 1941 |
| 2,667,364 | Colpo | Jan. 26, 1954 |